US011017782B2

(12) United States Patent
Short et al.

(10) Patent No.: US 11,017,782 B2
(45) Date of Patent: May 25, 2021

(54) SPEAKER CLASSIFICATION (71) Applicant: Xmos Inc., Hampton, NH (US)

(72) Inventors: Kevin Michael Short, Durham, NH (US); Kourosh Zarringhalam, Arlington, MA (US)

(73) Assignee: XMOS Ltd., Hampton, NH (US)

( * ) Notice: Subject to any disclaimer, the term of this patent is extended or adjusted under 35 U.S.C. 154(b) by 106 days.

(21) Appl. No.: 16/190,707

(22) Filed: Nov. 14, 2018

(65) Prior Publication Data
US 2020/0152204 A1    May 14, 2020

(51) Int. Cl.
*G10L 17/04* (2013.01)
*G06N 3/04* (2006.01)
*G06N 3/08* (2006.01)
*G10L 17/02* (2013.01)
*H04L 29/06* (2006.01)
*G10L 17/00* (2013.01)

(52) U.S. Cl.
CPC ............. *G10L 17/04* (2013.01); *G06N 3/04* (2013.01); *G06N 3/08* (2013.01); *G10L 17/00* (2013.01); *G10L 17/02* (2013.01); *H04L 63/102* (2013.01); *H04L 63/104* (2013.01)

(58) Field of Classification Search
CPC .......... G06N 3/04; G06N 3/08; H04L 63/102; H04L 63/104; G06F 3/167
USPC ................................................ 704/246–250
See application file for complete search history.

(56) References Cited

U.S. PATENT DOCUMENTS

| | | | |
|---|---|---|---|
| 6,754,628 B1 * | 6/2004 | Chaudhari | G10L 17/12 704/203 |
| 9,196,253 B2 * | 11/2015 | Nishiyama | G10L 17/06 |
| 9,564,123 B1 | 2/2017 | Mont-Reynaud et al. | |
| 10,049,675 B2 * | 8/2018 | Haughay | G10L 17/08 |
| 2005/0049862 A1 * | 3/2005 | Choi | G10L 17/00 704/231 |
| 2007/0061413 A1 | 3/2007 | Larsen et al. | |
| 2008/0010065 A1 * | 1/2008 | Bratt | G06K 9/6222 704/246 |
| 2008/0059156 A1 | 3/2008 | Han et al. | |
| 2014/0079248 A1 | 3/2014 | Short et al. | |
| 2015/0170674 A1 * | 6/2015 | Ishibashi | G10L 25/48 704/270 |

(Continued)

OTHER PUBLICATIONS

International Search Report and Written Opinion in International Application No. PCT/EP2019/079451, dated Dec. 10, 2019.

*Primary Examiner* — Jesse S Pullias
(74) *Attorney, Agent, or Firm* — Sughrue Mion, PLLC (57) ABSTRACT

A controller and method of classifying a user into one of a plurality of user classes. One or more voice samples are received from the user, from which a frequency spectrum is generated. One or more values defining respective features of the frequency spectrum are extracted from the frequency spectrum. Each of the respective features are defined by values of frequency, amplitude, and/or position in the spectrum. One or more of the respective features are resonant frequencies in the voice of the user. A user profile of the user is generated and comprises the extracted one or more values. The user profile is supplied to a machine learning algorithm that is trained to classify users as belonging to one of the plurality of user classes based on the one or more values in their respective user profile.

18 Claims, 4 Drawing Sheets

(56) References Cited

U.S. PATENT DOCUMENTS

2017/0011114 A1* 1/2017 Naressi .............. G06F 16/3344
2018/0182385 A1 6/2018 Stahl

* cited by examiner

SPEAKER CLASSIFICATION

TECHNICAL FIELD

The present disclosure relates to a method and controller for training a machine learning algorithm to classify a user into a user class based on voice samples received from the user.

BACKGROUND

Voice or speech recognition systems are becoming more prevalent in every-day life. For example, speech recognition enables the recognition and translation of spoken language into text and actions by computers. For instance, speech recognition can enable recognition of speech commands for the purpose of speech control. Such techniques may also be known as automatic speech recognition (ASR), computer speech recognition or speech to text (STT). User devices such as smartphones and smart devices often have a voice-user interface that makes human interaction with computers possible through a voice (speech) platform in order to initiate an automated service or process. Speech recognition applications include: smart device control (e.g. voice dialling), domestic appliance control, searching (e.g. for a music track or television programme), data entry (e.g. entering a credit card number), speech-to-text processing (e.g., word processors or emails), etc. Some user devices have an "intelligent" virtual assistant that can perform tasks or services for a user of the user device. Virtual assistants use natural language processing (NLP) to match voice input to executable commands.

Speaker recognition is different to speech recognition in that it is concerned with identifying who is speaking instead of what is being said (or in addition to what is being said). Speaker recognition is performed based on the characteristics of a person's voice, with each person having characteristics that are a feature of their anatomy and environment. Speaker recognition applications include: user identification, user authentication (e.g. authorizing the user as part a security log-in process), and supplementing the speech recognition process (e.g. knowing the user has a particular accent can be used to simplify the task of translating speech to text).

SUMMARY

The human body has several cavities that affect a person's speech. One such cavity is the vocal tract that consists of the laryngeal cavity (i.e. the cavity of the larynx), the pharynx (i.e. the part of the throat that is behind the mouth and nasal cavity and above the esophagus and the larynx), the oral cavity, and the nasal cavity (i.e. the nasal passage that begins with the nostrils). The body's cavities cause the sound waves produced when a person speaks to vibrate with higher amplitudes at certain frequencies (i.e. resonant frequencies). The resonant frequencies are dependent on the shape and size of a cavity and therefore, in general, a person's voice will have resonant frequencies unique to that person.

According to a first aspect disclosed herein, there is provided a method of receiving one or more voice samples sampling a voice of the user; generating a frequency spectrum from the one or more voice samples; extracting one or more values quantifying respective features of the frequency spectrum, wherein each of the respective features is defined by a value of frequency, amplitude, and/or position in the frequency spectrum, and wherein one or more of the respective features are resonant frequencies in the voice of the user; generating a user profile of the user, the user profile comprising the extracted one or more values; and supplying the user profile to a machine learning algorithm to train the machine learning algorithm to classify users as belonging to one of the plurality of user classes based on the one or more values in their respective user profile. The position may, for example, be a frequency bin number.

A user's frequency spectrum has a specific set of features that are unique to that user. Therefore the user profile generated from those unique features is unique to that person. The machine learning algorithm is then able to distinguish between users with a high degree of accuracy in order to classify users into the correct user class.

In embodiments, at least one of the user classes may be a group class classifying a group of users together in the same class.

In embodiments, the individual user classes may comprise a father class classifying a father of a family and a mother class classifying a mother of the family. At least one group class may comprise a child class classifying more than one child of the family as a group.

In embodiments, a permission setting of a user device may be adapted based on the class into which the user is classified. For example, the permission setting of the user device may be different for a father or mother class compared to a child class. That is, the father or mother may be granted access to more (or different) services or systems of the user device compared to a child. As an example, if a user is classified as belonging to a child class, the permission setting of the user device may be adapted such that access to the internet is (partially or wholly) restricted.

In embodiments, the resonant frequency may be the resonant frequency of a body cavity of the user.

In embodiments, the method may comprise: subsequently generating an unclassified user profile for an unclassified user, the unclassified user profile comprising one or more values quantifying respective features of a frequency spectrum generated from a voice sample received from the unclassified user; and supplying the unclassified user profile to the trained machine learning algorithm, and based thereon classifying the unclassified user into one of the plurality of user classes based on the one or more values in the unclassified user profile.

In embodiments, the plurality of user classes may comprise: a father class, a mother class, and one or more children classes.

In embodiments, each of at least some of the plurality of user classes may be an individual user class.

In embodiments, the resonant frequency may be a fundamental frequency of the user's voice. In some examples, the fundamental frequency (or pitch) may be at a lower frequency than the first resonant frequency.

In embodiments, wherein the respective features may comprise one or more of: —an amplitude and/or frequency of one or more maxima of the frequency spectrum; —an amplitude and/or frequency of one or more minima of the frequency spectrum; and—one or more integrals corresponding to respective areas delineated by adjacent minima of the generated frequency spectrum.

In embodiments, said receiving of the one or more voice samples from the user may comprise receiving a plurality of voice samples from the user, and wherein said generating of the frequency spectrum comprises generating an average frequency spectrum from the plurality of voice samples; and wherein said extracting comprises extracting the one or more values of the respective features from the average frequency spectrum.

In embodiments, the method may comprise generating a spectral envelope of the frequency spectrum, and wherein said extracting comprises extracting the one or more values of the respective features of the spectral envelope.

In embodiments, the spectral envelope may be generated by applying a spline fit to the frequency spectrum.

In embodiments, the method may comprise: determining an average phoneme generation rate of the user based on the received one or more voice samples, wherein the user profile comprises the average phoneme generation rate; and wherein the machine learning algorithm is also trained to classify a user as belonging to one of the plurality of user classes based on the average phoneme generation rate in the user profile.

In embodiments, the method may comprise: over time, receiving additional voice samples from the user; and generating an updated frequency spectrum from the additional voice samples; extracting one or more values quantifying respective features of the updated frequency spectrum; and updating the user profile of the user based on the values defining respective features of the updated frequency spectrum.

In embodiments, the method may comprise: adapting a permissions setting of a user device based on which user class the user is classified into, wherein the permissions setting allows conditional access to a system of the user device.

In embodiments, the generated user profile may comprise a user identifier of the user.

In embodiments, the method may comprise receiving the user identifier from the user.

In embodiments, each of the one or more voice samples may be a respective time domain signal, and wherein generating the frequency spectrum comprises, for each time domain signal: applying a windowing function to the time domain signal to create a first data set and a second data set, wherein the first and second data sets are formed of sequential samples of the time domain signal, and wherein the second data set is offset in time by at least one sample compared to the first data set; applying a frequency domain transform to the first data set and the second data set to transform the first and second data sets to first and second transformed data sets respectively; performing a complex spectral phase evolution on the first and second transformed data sets to estimate underlying component frequencies corresponding to oscillator peaks in the first and second datasets, wherein the complex spectral phase evolution is performed by determining the complex product of the first and second transformed data sets; determining a high resolution frequency domain transform of the windowing function, and using the component frequencies to fit said transform of the windowing function to at least one of an amplitude, phase, amplitude modulation and frequency modulation of at least one of said oscillator peaks; and generating the frequency spectrum out of one or more of said oscillator peaks that have been identified, using a tracking algorithm, as emanating from the user. In some examples, in the complex product there may be a conjugate applied to one of the transformed data sets. The conjugate can be applied to either one of the transformed data sets.

In embodiments, the one or more values of the user profile may form a respective data point in an feature space, and wherein the machine learning algorithm is trained to classify users as belonging to one of the plurality of classes by transforming co-ordinates of the feature space, wherein the co-ordinates of the transformed feature space are a linear transformation of the respective data points and amount to a direction of maximal dissimilarity between user classes.

In embodiments, the machine learning algorithm may be trained to learn a distance metric that projects the respective data points onto the direction of maximal dissimilarity.

According to a second aspect disclosed herein, there is provided a controller for classifying a user into one of a plurality of user classes, wherein the controller is configured to: receive one or more voice samples from the user; generate a frequency spectrum from the one or more voice samples; extract one or more values defining respective features of the frequency spectrum, wherein each of the respective features is defined by a value of frequency, amplitude, and/or position in the frequency spectrum, and wherein one or more of the respective features are resonant frequencies in the voice of the user; generate a user profile of the user, the user profile comprising the extracted one or more values; and supply the user profile to a machine learning algorithm that is trained to classify users as belonging to one of the plurality of user classes based on the one or more values in their respective user profile.

According to a third aspect disclosed herein, there is provided a computer program for classifying a user into one of a plurality of user classes, wherein the computer program comprises instructions embodied on computer-readable storage and configured so as to, when the program is executed by a computer, cause the computer to perform operations of: receiving one or more voice samples sampling a voice of the user; generating a frequency spectrum from the one or more voice samples; extracting one or more values quantifying respective features of the frequency spectrum, wherein each of the respective features is defined by a value of frequency, amplitude, and/or position in the frequency spectrum, and wherein one or more of the respective features are resonant frequencies in the voice of the user; generating a user profile of the user, the user profile comprising the extracted one or more values; and supplying the user profile to a machine learning algorithm to train the machine learning algorithm to classify users as belonging to one of the plurality of user classes based on the one or more values in their respective user profile.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
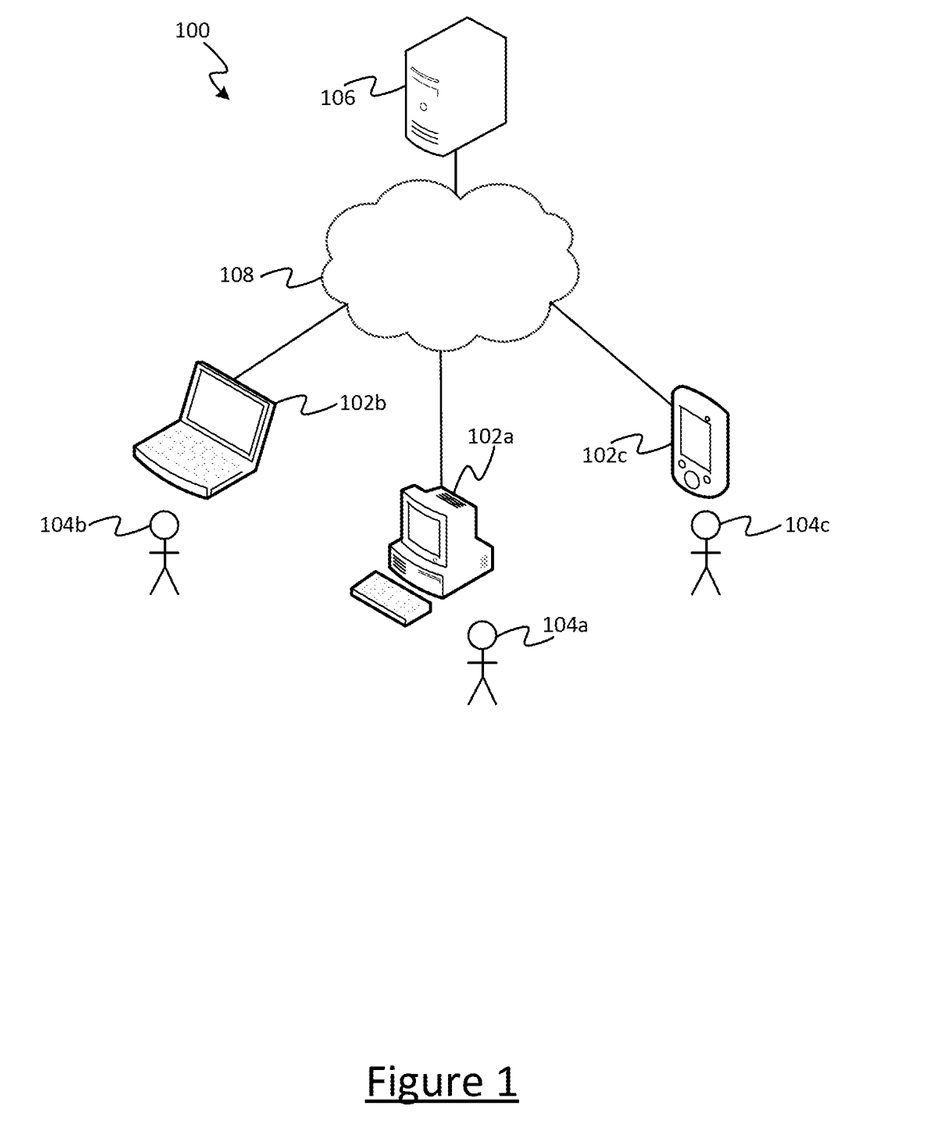
FIG. 1 shows schematically an example system for receiving voice samples from different users.

FIG. 1 illustrates an example system 100 for receiving voice samples from a plurality of users for use in classifying each user into a user class. The system 100 comprises user devices 102a-c operated by users 104a-c and computing equipment 106 comprising some or all of the resources of a server connected to a network 108, the server comprising one or more server units at one or more geographic sites. The user devices 102 and server 106 are connected via a network 108, e.g. the internet.

Figure 2:
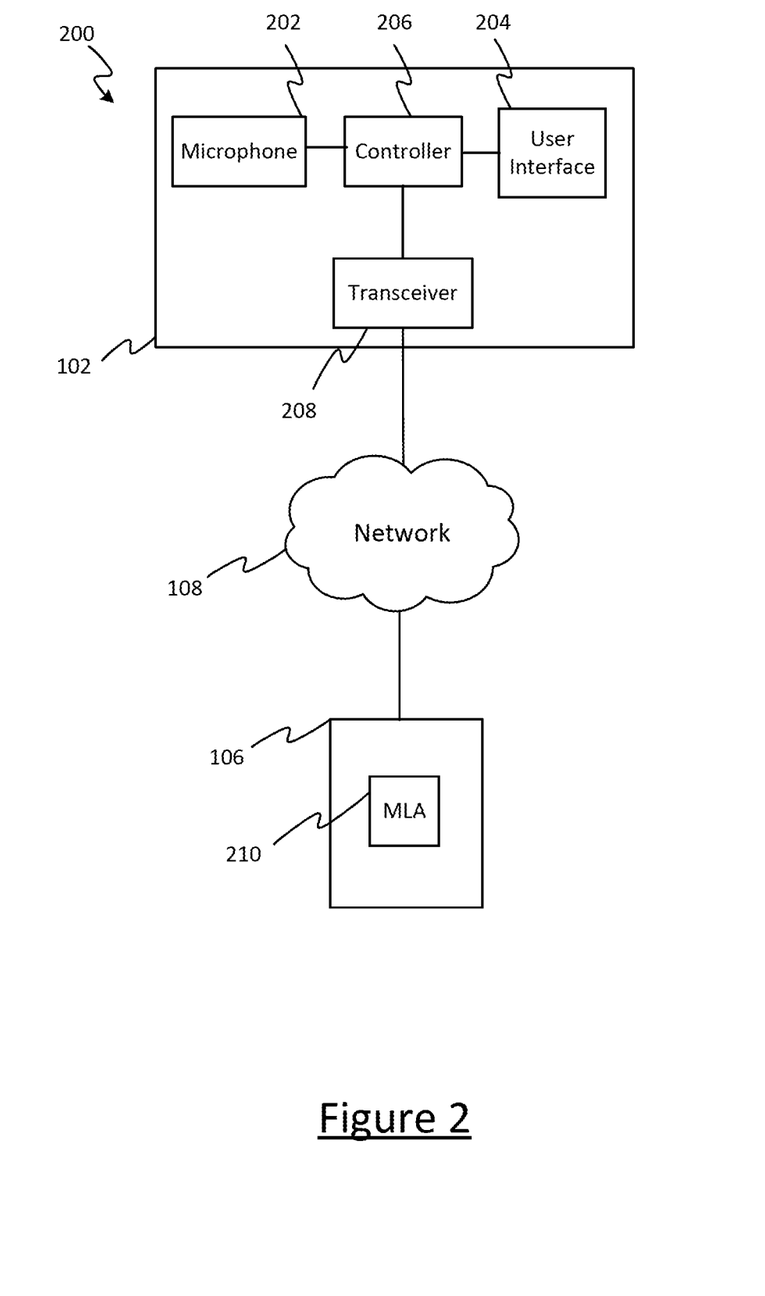
FIG. 2 shows schematically an example system for classifying a user into one of a plurality of user classes.

As illustrated in the communication system 200 of FIG. 2, each user device 102 may in general be any device with one or more microphones 202 arranged to detect audio signals. For example, the user device 100 may be a media device such as a television set, a personal computing device such as a laptop or desktop or tablet computer, a video game console, a mobile device including mobile or cellular phone (including a so-called "smart phone"), a dedicated media player (e.g. an MP3 or similar player), a wearable communication device (including so-called "smart watches"), etc. The user device 102 may also be a "voice-controllable device, including so-called "smart devices" with intelligent personal assistants. Voice-controllable devices are capable of one or two-way voice interaction with a user of the user device 102, and may even interact with other connected devices or services. To interact with a voice-controllable device, a user typically says a keyword, often called a "wake-up word" or command, such as "Hey Siri", "Hello Alexa", etc. The user can then issue a voice command for the user device 102 to perform actions such as, for example, provide weather and sports reports, play music, manage alarms, timers and to-do lists, etc. The user device 102 may be controllable by voice commands. Examples of a voice-controllable device 104 include Amazon Echo™, Amazon Dot™, Google Home™, etc.

The user device 102 may optionally have a user interface 204 such as, for example, a display in the form of a screen for receiving inputs from the user. For example, the user interface may comprise a touch screen, or a point-and-click user interface comprising a mouse, track pad, or tracker ball or the like. The user interface 204 is configured to receive inputs from a user of the user device. The user device 102 may also have one or more speakers arranged to output audio signals.

A controller 206 configured to perform embodiments of the invention is shown housed in the user device 102. The controller 206 of the user device 102 may be implemented across one or more processors of the user device 102 and be operatively coupled to the microphone(s) of the user device 102. Alternatively, the controller 206 may be separate from the user device 102. For example, the controller 206 may be performed by the computing equipment 106. In that case, the controller may be implemented across one or more of the server units of the computing equipment 106. The controller 204 may instead be partially implemented on the user device 102 and partially implemented on the computing equipment 106.

In embodiments the functionality of the controller 206 (e.g. the server(s)) is implemented in the form of software stored in memory and arranged for execution on a processor (the memory on which the software is stored comprising one or more memory units employing one or more storage media, e.g. EEPROM or a magnetic drive, and the processor on which the software is run comprising one or more processing units). Alternatively it is not excluded that some or all of the functionality of the controller 206 could be implemented in dedicated hardware circuitry, or configurable or reconfigurable hardware circuitry such as an ASIC or a PGA or FPGA. The controller 206 may be connected to the network via a local area network such as a WLAN or a wide area network, such as the internet. Alternatively, the controller 206 may comprise a wired connection to the network 108, e.g. an Ethernet or DMX connection.

The controller 206 is operatively coupled to the user device 102. For example, the user device 102 may be coupled to the controller 206 via a wired or wireless connection. In this example, the controller of the user device 102 may be operatively coupled to a wireless transceiver 208 for communicating via any suitable wireless medium, e.g. a radio transceiver for communicating via a radio channel (though other forms are not excluded, e.g. an infrared transceiver). The wireless transceiver 208 may comprise a Wi-Fi, Bluetooth, etc. interface for enabling the user device 102 to communicate wirelessly with the controller 206. Additionally or alternatively, the wireless transceiver may communicate with the controller 206 via a wireless router or a server (not shown), for example, over a local area network such as a WLAN or a wide area network such as the internet. The user device 102 may also communicate with the controller 206 via a wired connection.

The controller 206 is operatively coupled to a machine learning algorithm 210. The functionality of the machine learning algorithm 210 is implemented in the form of software stored in memory and arranged for execution on a processor (the memory on which the software is stored comprising one or more memory units employing one or more storage media, e.g. EEPROM or a magnetic drive, and the processor on which the software is run comprising one or more processing units). Alternatively it is not excluded that some or all of the functionality of the controller 206 could be implemented in dedicated hardware circuitry, or configurable or reconfigurable hardware circuitry such as an ASIC or a PGA or FPGA. In FIG. 2 the machine learning algorithm (MLA)_210 is shown as being implemented by the computing equipment 106 (e.g. the machine learning algorithm is implemented on one or more servers situated at one or more geographic sites). However, in general the machine learning algorithm 210 may be implemented in part or in whole by each of the user device 102, controller 206 and computing equipment 106.

The machine learning algorithm 210 may comprise a neural network, plus an algorithm such as a back-propagation algorithm for training that neural network. The machine learning algorithm 210 may for example take the form of a first neural network and feedback algorithm arranged to train an artificial neural network. The machine learning algorithm 210 may comprise a model (e.g. neural net) which maps a set of inputs to a set of outputs. A training algorithm trains the mapping of the model (at least in a supervised approach) based on training data comprising i) multiple example values of the input(s), and ii) the corresponding experienced values of the output(s) that resulted from those training inputs. Based on this data, the training algorithm can adapt the mapping of the input(s) to the output(s) in its model so that the mapped outputs of the model will tend towards matching the experienced outputs in the training data. This model can then be used to subsequently infer a value of the output(s) for any given value of the input(s). The artificial neural network may be a deep neural network comprising a plurality of (hidden) layers. The input(s) are mapped to a first layer, which may be mapped to a second layer, which may be mapped to a third layer, and so on. The final layer is mapped to the output(s). The deep neural network may comprise any number of layers, and the mapping between each layer, which may differ between layers, may be linear or non-linear. Alternatively other forms of machine learning algorithm such as a clustering algorithm are not excluded.

Embodiments of the invention are performed by the controller 206 to make use of features of a user's voice in order to classify that user into a particular user class.

The controller 206 is configured to receive one or more voice samples from a user 102. For example, the voice samples may be part of an audio signal detected by one or more microphones of the user device 102. The voice samples may be provided to the controller 206 directly, or the voice samples may first undergo pre-processing to, for example, separate the voice samples into individual sentences, or remove background noise. The voice samples may be keywords detected as part of keyword initiation. Conversely, the voice samples need not be keywords. For example, the voice samples may be collected as part of a question and answer session. For example, the user interface may output questions to the user 104 and the user may respond to those questions, the answers being detected by the microphone. As another example, the user 104 may have a conversation with an "intelligent assistant" operated by the user device 102.

Figure 3A:
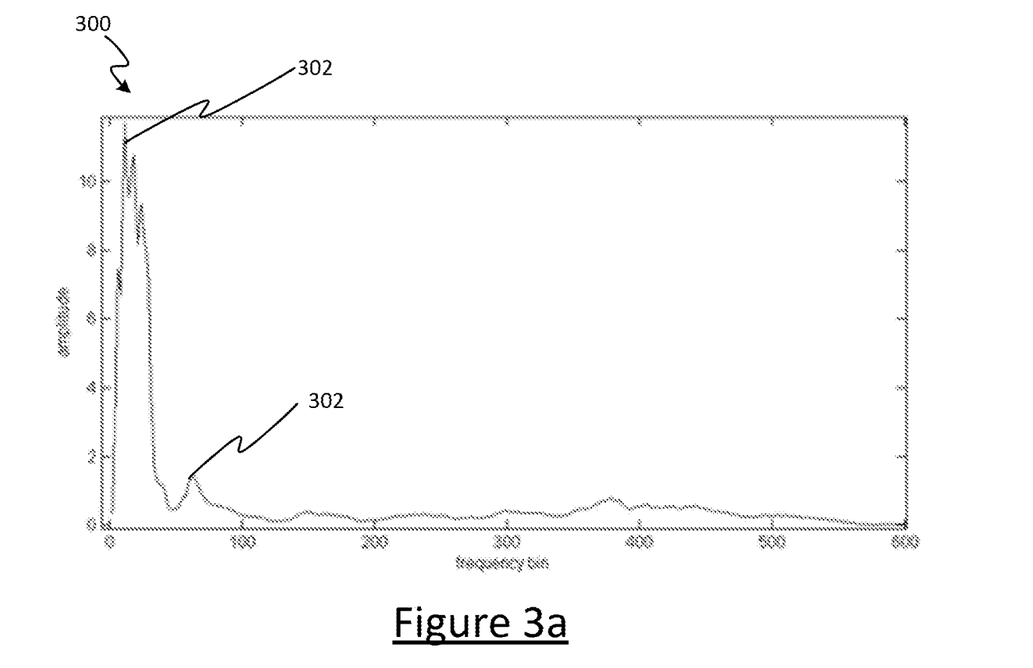
FIGS. 3a and 3b show schematically example frequency spectrums generated from one or more voice samples received from a user.

The controller 206 is configured to generate a frequency spectrum from the one or more voice samples. The frequency spectrum is a representation of the user's voice. An example frequency spectrum 300 is shown in FIG. 3a. The frequency spectrum 300 may be generated from a single voice sample. Alternatively, to build a more accurate representation of the user's voice, the frequency spectrum 300 may be generated from a plurality of voice samples.

Figure 3B:
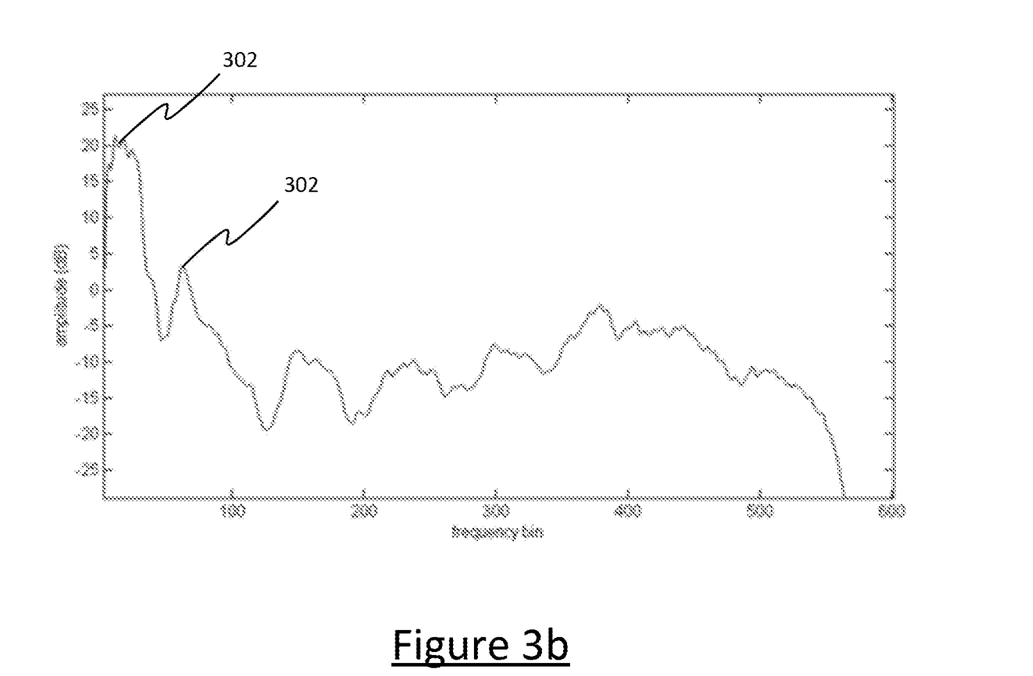

As shown in FIG. 3a, the generated frequency spectrum 300 comprises a plurality of features 302 (e.g. peaks and troughs). These features are specific to the user and at least some of these features 302 are dependent on the user's body cavities (e.g. the vocal tract). That is, some of the features 302 are resonant frequencies. FIG. 3b illustrates the frequency spectrum 300 of FIG. 3a plotted on a log-scale such that the features 302 can be viewed more easily. These features 302 are defined by values such as frequency (e.g. a frequency at which a peak occurs) and amplitude (e.g. an amplitude of the peak). At least one of the features 302 is a resonant frequency (e.g. caused by a body cavity). The frequency spectrum 300 may be made up of a number of resonant frequencies. The controller is configured to build a user profile for the user by extracting one or more values from the frequency spectrum 300 that define a respective frequency. One set of values extracted from the frequency spectrum 300 defines a resonant frequency. The amplitude may be a measure of, for example, the power or the power spectral density of the signal at a given frequency.

The user profile generated by the controller comprises the values describing respective features 302 of the frequency spectrum 300. The user profile may optionally comprise a user identifier. The user identifier may be provided by the user, e.g. via the user interface or microphone(s). For example, the user may provide their name as part of the Q&A session. Alternatively, the controller may assign the user identifier to the user profile automatically without input from the user. The user profile is supplied to the machine learning algorithm (which may or may not be part of the controller). The machine learning algorithm is trained to classify users as belonging to a class of users. The classification is based on the user's user profile, in particular, the values contained in the user profile. The machine learning algorithm is trained such that similar user profiles are grouped into the same class, whilst dissimilar user profiles are excluded from that class.

Machine learning methods are in general known in the art and can broadly be separated into unsupervised learning methods and supervised learning methods. These methods may be implemented by, for example, neural networks.

An unsupervised learning method can be used to produce a predictive model from unlabeled data. That is, a classification or categorization of the user profiles is not provided. One example of an unsupervised learning method is cluster analysis, which is used for exploratory data analysis to find hidden patterns or grouping in data. Clustering is the task of grouping a set of data in such a way that data in the same group (called a cluster) are more similar (in some sense) to each other than to those in other groups (clusters). The clusters are modelled using a measure of similarity. In an example, the machine learning algorithm receives user profiles without being told which class they belong to. Once trained, the algorithm can take new user profiles and predict which of the user classes the new user profile should be placed into.

Alternatively, a supervised learning method can be used. In this case, the user profiles are provided to the machine learning algorithm along with a class identifier. In some examples, the user identifier may be the class identifier. The algorithm is then trained to learn why certain user profiles (in particular the values of the features 302 in those profiles) belong to a certain class. Once trained, the algorithm can take a new user profile and match it to a user class based on what it has learnt about the other user profiles in the existing classes.

After an initial training phase, the controller is configured to allocate an "unclassified" user profile into one of the plurality of user classes. Here, unclassified is intended to refer to a user profile that is generated based on one or more voice samples received after the initial training phase. The voice sample(s) may be from a user who has already been classified into a user class, but in this sense the user profile is still "unclassified" until the machine learning algorithm classifies it into an existing user class. To do this, the controller generates a frequency spectrum 300 from the voice sample(s). The controller may receive a single voice sample (e.g. a single phrase or sentence), or multiple voice sample (e.g. part of a conversation). As before, features 302 will be present in the frequency spectrum 300. The features 302 may be resonant frequencies. Each feature is defined by one or more values. An unclassified user profile comprising values extracted from the frequency spectrum 300 is supplied to the machine learning algorithm that, based on its training, classifies the unclassified user profile into one of the user classes.

As an example, the controller may receive voice samples from a family of users: a father, a mother, a son and a daughter. Each user's voice samples will produce a respective frequency spectrum 300 having definable features 302. The controller generates a respective user profile for each user by extracting values that define the features 302 in their respective frequency spectrums. Each user profile is supplied to the machine learning algorithm. The machine learning algorithm is trained to identify which values (or combinations of values or transformations of values) are unique to an individual user in order to separate the user profiles into distinct classes (i.e. a father class, a mother class, a son class, and a daughter class). In some cases, there may be no unique values that are identifiable as coming from an individual speaker, but the aggregate information derived from the features (with or without further transformation) may serve as an identifier/classifier. As an alternative, the machine learning algorithm may group more than one user profile into the same class, e.g. based on similar values in their user profiles. For instance, the son and daughter may be grouped into the same class (e.g. a children class). The machine learning algorithm may learn these classes themselves or it may be supplied a user identifier which acts as a class label for each user profile.

The features 302 of a generated frequency spectrum 300 will differ on a user-by-user basis. An example of a frequency spectrum 300 is shown in FIG. 3a. The frequency spectrum 300 comprises a plurality of peaks and troughs. The frequency spectrum 300 may comprise a fundamental frequency (or pitch) of a user's voice. The fundamental frequency is identified by a peak at the lower end of the frequency spectrum 300. It is attributed to the frequency of vocal fold vibration and correlates with changes in vocal fold tension. A typical adult male will have a fundamental frequency from 85 to 155 Hz, and that of a typical adult female from 165 to 255 Hz ("Modal Fundamental Frequency of Young Adults", J. L. Fitch and A. Holbrook, 1970, Archives of Otolaryngology, 92, p. 381). Children and babies have even higher fundamental frequencies. A young boy or girl might have a fundamental frequency around 400 Hz. When humans speak, it is natural for their fundamental frequency to vary within a range of frequencies. The frequency spectrum 300 may also include other resonant frequencies, for example, harmonics and formants. Harmonics are dependent on the user's vocal chords, whilst formants are dependent on the size and shape of the user's cavities (e.g. the vocal tract). Like the fundamental frequency, the harmonics and formants are defined by values of frequency and amplitude.

The controller may extract values defining one or more maxima (or peaks) of the frequency spectrum 300. For example, the values defining the fundamental frequency, the formants and/or the harmonics. The controller may also extract values defining one or more minima (or troughs) of the frequency spectrum 300. For example, the values defining the minima in between adjacent resonant frequencies. As another example, the controller may determine one or more integrals of the frequency spectrum 300. For example, the integrals may be the areas under the peaks of the spectrum, i.e. the area defined by adjacent minima (or troughs) of the spectrum.

If more than one voice sample is received from the user, the controller may generate an average frequency spectrum 300 from the multiple voice samples. For example, each voice sample may be a phrase or a sentence. The average frequency spectrum 300 may be averaged over some or all of those phrases or sentences. The controller may extract values defining the features 302 in the average spectrum, and use those values to build the user profile that is supplied to the machine learning algorithm.

Figure 4:
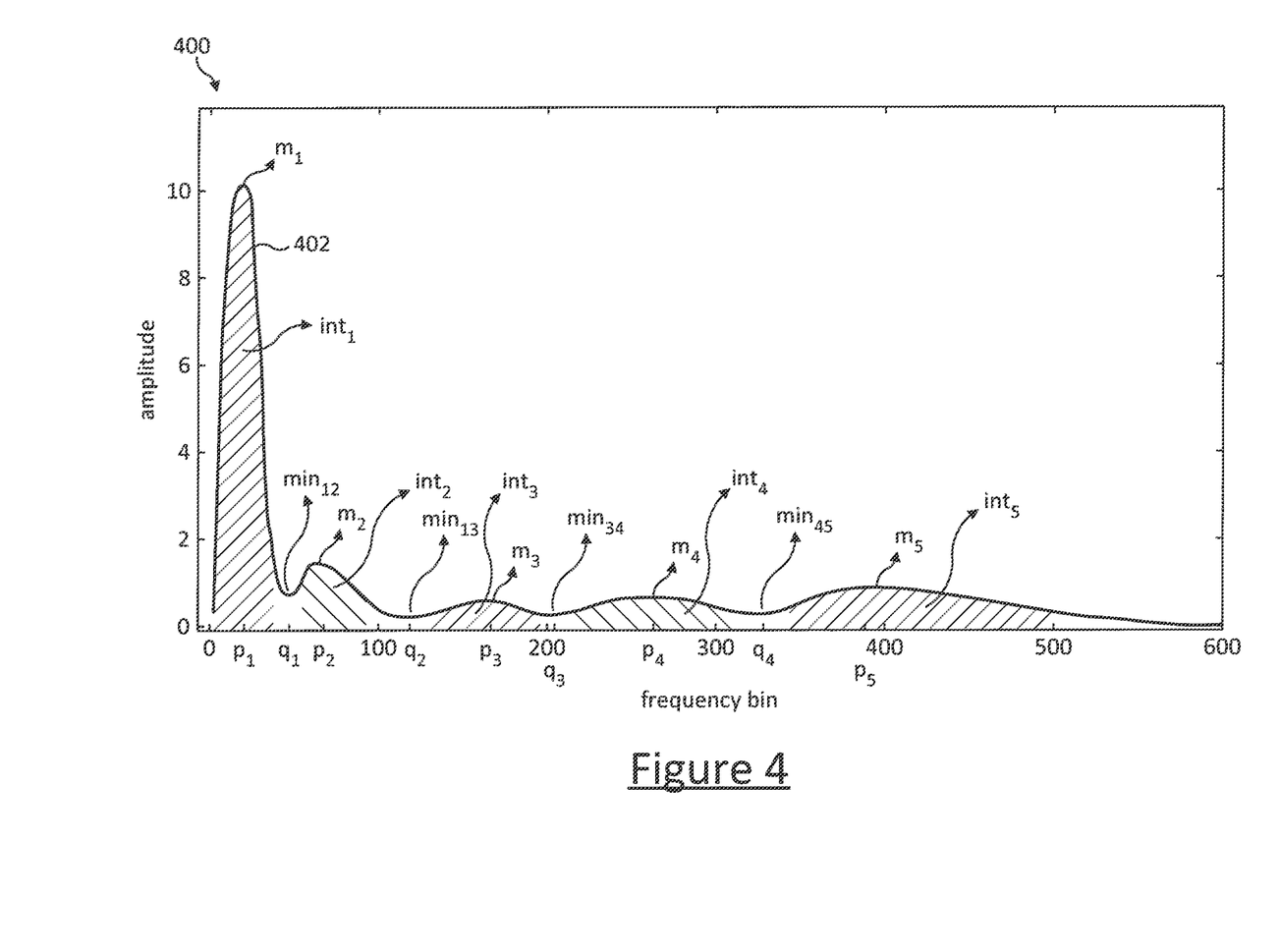
FIG. 4 shows schematically an example spectral envelope of a frequency spectrum.

Optionally, a smoothed version of the frequency spectrum (e.g. the average frequency spectrum) can be generated so that certain features 302 may be distinguished on a coarse or broad scale. That is, the controller is configured to generate a spectral envelope 402 of the frequency spectrum. FIG. 4 illustrates a spectral envelope of an example frequency spectrum 400. To generate the spectral envelope, a spline fit is applied to the data, i.e. a cubic spline is fit to segments of the voice sample data. One particular fit that can be used is a constrained spline fit (with "knots") to fit the spectrum (for example, using the LSQUnivariateSpline in the python scipy toolbox). In some examples, the spline fit is further constrained by imposing conditions on the positions of the knots used in generation of the spline fit, and these knots may be placed at positions that are a function of the fundamental frequency of the user's voice samples.

The controller may extract values of the features 302 formed by the spectral envelope. For instance, the controller may extract the frequency and/or amplitude of the maxima and minima of the spectral envelope. The controller may determine the integrals of the areas formed underneath the maxima of the spectral envelope. Taking the example of FIG. 4, the first features 302 of interest are related to the observed maxima and minima of the spectrum. These values are returned from the spline fit, and include the vector of maxima $[m_1, m_2, m_3, m_4, m_5]$ and the related positions of the maxima $[p_1, p_2, p_3, p_4, p_5]$. The information in these vectors implicitly captures a great deal of information about the speaker of interest, since human speakers tend to have approximately 5 or so resonance zones, with the lowest three resonances of particular interest in identifying a speaker. A further set of values calculated from the spline fit include the vector of minima $[min_{12}, min_{23}, min_{34}, min_{45}]$ where $min_{ij}$ represents the minimum between lobe i and lobe j of the spline fit, along with the related positions of the minima $[q_1, q_2, q_3, q_4]$. The classification results can be further improved if values of the integrated area under the lobes of the spline fit is extracted, since this represents a parameter related to the overall power in one of the resonance zones.

To improve the classification of users, certain fine scale features can be extracted from the frequency spectrum 300, along with the features from the spectral envelope (spline fit). For example, in some instances, it may be that members of a family are similar enough in body type (e.g. a father and an adult son) that the coarse scale structures revealed by the spline fit are too similar to allow good classification. In that case, it is beneficial to extract values from the original frequency spectrum 300 and from the spectral envelope in order to correctly classify the user.

The controller may be configured to determine an average phoneme generation rate of the user (i.e. the rate at which the user speaks). A phoneme is a unit of sound that distinguishes one sub-unit of a word from another in a particular language, i.e. i.e. a perceptually distinct unit of sound. For example, a phenome would correspond to a phonetic spelling in a dictionary. The average phenome generation rate may be determined by observing the patterns in the frequency spectrum over time. When a particular voiced phoneme is spoken, a pattern of harmonics is generated at frequencies of 2× the fundamental frequency, 3×, the fundamental frequency 4×, the fundamental frequency, and so on. As these patterns change (often with gaps between), the controller can determine the beginnings and ends of new phonemes. The user profile generated for a user may include the average phoneme generation rate, with the machine learning algorithm being trained to classify the user profiles based on features that include the phenome generation rate.

There are many variables that affect the spectrum generated from recorded voice samples, including record volume settings (gain) and sample rate. In order to make the system robust in the presence of this variability, normalizations may be applied to the data. This can be considered as mathematically converting the data so that all audio is transformed to a common coordinate system or comparison space. These normalizations are performed differently for the index-like data and the magnitude-like data. Examples of the index data include the frequencies of the maxima or minima. Examples of magnitude-like data include the amplitudes of the maxima or minima, along with the integrated area under the lobes of the spline.

For the normalization of the index-like data, one approach is to divide the vector of indices by the maximum index. So, for example, to normalize the vector of positions of the maxima $[p_1, p_2, p_3, p_4, p_5]$, one can divide all entries by the maximum frequency bin in the spectrum. Since the maximum frequency bin is constant for all (averaged) spectrum that are calculated in the same way (i.e., the analysis is done with time-windows of the same length), the maximum frequency bin in the spectrum is consistent for all of the transforms). If the voice samples are collected with different sample rates or other varying elements, then instead of dividing by the maximum frequency bin, the controller may divide by the bin number corresponding to a specified frequency, for example, the frequency bin corresponding to 8 kHz.

For the normalization of the magnitude-like vectors, the vectors are normalized to have unit length. The controller divides the magnitude-like vector by the (Euclidean) length of the vector. So, for the vector of maxima $[m_1, m_2, m_3, m_4, m_5]$, the normalized feature $m_{norm}$ is calculated as:

$$\vec{m} = [m_1, m_2, m_3, m_4, m_5]$$

$$\|\vec{m}\| = \sqrt{\sum m_i^2}$$

$$m_{norm} = \vec{m}/\|\vec{m}\|$$

Once all of the features 302 have been computed and normalized, they are concatenated to form a feature vector (i.e. the user profile) that can serve as the input into the machine learning algorithm (e.g. a neural network classifier). These user profiles can be computed from short voice samples (such as for a single sentence or sequence of a few words) or for a collection of voice samples.

Furthermore, it is possible to start with a small set of voice samples that form an initial view of a user, and as further voice samples are collected, the information about the user may be further refined and made more robust. Therefore the controller is configured to receive additional voice samples from the user over time and use these voice samples to generate an updated user profile. The machine learning algorithm is trained to build a more accurate classification of the user based on the updated user profile.

One technique for generating the frequency spectrum 300 is known as source signal separation. Source signal separation is the separation of a signal into its individual constituent elements, such that those elements may be deconstructed, isolated, extracted, enhanced, or reconstructed in isolation, in part or in whole. First, a signal is selected for analysis. For example, one or more voice samples are selected. A windowing function is applied to the selected signal to take a finite window of samples of the signal, optionally with some form of shaping such as tapering. A first data set of N points and a second data set of N points are created by applying the windowing function to the signal, with the second data set having a (small) time offset from the first, i.e. there is a time delay between the start of the first data set and the start of the second data set. The form and size of the windowing functions, along with the value of the time offset between the windows are definable parameters. Examples of windowing functions include, Hanning, Hamming, boxcar, triangle, Bartlett, Blackman, Chebyshev, Gaussian, etc. The first and second data set may be offset in time by one or more data samples. As an example, the first and second data sets may be contiguous.

A frequency domain transform is applied to the first and second data sets, separately. The transform transforms the time domain data sets to respective frequency domain data sets. Examples of frequency domain transforms include Fast Fourier Transform, Discrete Fourier Transform, Discrete Cosine Transform, and so on. The accuracy of the frequency estimates created by such transforms is limited by the number of input samples. A transform-domain representation of a signal can have both real and imaginary parts, i.e. it is complex.

A complex spectral phase evolution (CSPE) may be performed on the first and second transformed data sets to estimate underlying component frequencies corresponding to oscillator peaks in the first and second datasets. However, whilst CSPE is beneficial as it produces higher resolution spectra, in general, embodiments of the invention may utilise any applicable spectral representation.

Complex spectral phase evolution is, in itself, known in the art. See "Signal analysis using the complex spectral phase evolution (CSPE) method", Kevin Short & Ricardo A Garcia; "Multichannel Audio Processing Using the Unified Domain Representation," Short, Kevin M.; Garcia, Ricardo A.; Daniels, Michelle L., Journal of the Audio Engineering Society, Volume 55, Issue 3, pp. 156-165; March 2007; or Wang, Jian et al. "Using Apodization to improve the performance of the Complex Spectral Phase Estimation (CSPE) Algorithm", 2011.

The goal of the CSPE is to analyse the phase evolution of the components of the signal between an initial sample of N points and a time-delayed sample of N points. By multiplying the shifted, transformed spectrum (i.e. the second transformed data set) with the complex product (or conjugate) of the initial transformed spectrum (i.e. the first transformed data set), a frequency dependent function is formed from which the exact values of the frequency components it contains can be detected. The phase information resulting from the complex frequency domain transform is used to give a greater resolution estimate of the frequency of a particular component, compared to just looking at the power or amplitude spectrum alone.

A high-resolution frequency domain transform of the windowing function is performed and stored for peak analysis. The transform of the windowing function will form a certain 3-D curve in the frequency-amplitude-phase space of the frequency domain. The transformed window function is aligned with the super resolution estimate of the frequency of the peak in the frequency domain (determined from the CSPE of the first and second transformed data sets), and then values for its amplitude and/or phase at that frequency are determined which best fit the transformed window function to the underlying peak in question. This component of the wanted signal can then be modelled as a frequency domain feature having the form of the transformed windowing function and parameterized by the values of the super resolution frequency and corresponding amplitude and/or phase as found in the fitting. Optionally, the effect of a component of the wanted signal can be removed so that estimates of nearby peaks are improved. The frequency spectrum 300 is then generated out of the peaks that have been identified as emanating from the user. This is achieved by using a tracking algorithm.

When taking the oscillator peak representation and doing a partial reconstruction of the underlying audio, to simplify the process only the more powerful parts of the spectrum created by an individual oscillator peak may be reconstructed, and any interactions between oscillator peaks are ignored. This simplification is still beneficial in determining an average spectrum, rather than a frequency and phase accurate reconstruction of a given time-window of data.

As discussed above, the machine learning algorithm may take the form of a multi-class supervised learning model, where the classes are users and the input features (user profiles) for each user comprise values of various features such as pitch, positions and magnitudes of formants, etc., that characterize the user's voice. The machine learning algorithm may be, for example, a multi-class logistic regression with Ridge regularization, a multi-class logistic regression with $l_1$ regularization, a multi-class Support Vector Machine with RBF kernel, a linear discriminant analysis, a quadratic discriminant analysis, an artificial neural network, or a new technique referred to herein as multi-class distance metric learning scaled linear discriminant analysis (SLDA). In SLDA data points are linearly transformed so that similar points are clustered more closely, while the distance between dissimilar points stay bounded. This is particularly useful when clusters can be more or less linearly separated, and requires very few parameters to fit.

In SLDA, a linear transformation of the data points is learned from the training data, such that the new coordinates correspond to directions of maximum dissimilarity. This is analogous to a PCA where an orthogonal transformation is utilized to identify directions of maximum variance. In PCA the first principal coordinate (or component) has the largest possible variance and each subsequent coordinate has the next highest variance in a complementary direction. In contrast, SLDA identifies orthogonal directions where class dissimilarities are maximized. The first SLDA component has the maximum class separation with linear decision boundaries and the subsequent components have the next maximum class separation in an orthogonal fashion. In addition, SLDA scales the direction to obtain optimal class separation in a controlled way using an entropy tuning technique.

SLDA is formulated as an entropy penalized distance metric learning problem. Many machine learning algorithms, such as K Nearest Neighbour, heavily rely on the distance metric for the input data patterns. Distance metric learning is the process of learning a distance metric for the input space of data from a given collection of pairs of similar or dissimilar points that preserves the distance relation among the training data. The distinction of SLDA with pre-existing metric learning models is that unlike traditional methods, the same distance metric is used for measuring distances between points, regardless of the class, while controlling the collapse of dimensions by enforcing a bound based on the Von Neumann entropy of the optimal metric. Importantly, this formulation results in an analytic solution of the problem, hence speeding up the fitting process considerably compared with other metric learning models that rely on numerical optimization techniques.

More precisely, let $\{(x_i, l(x_i))\}$ be a set of labelled training data with sample points $x_i$ and their labels $l(x_i)$. The optimal distance metric $d_S(x, y)$ minimises the distance between similar pairs of data points whilst keeping dissimilar pairs apart.

The optimal distance between the points in the transformed space is given by:

$$d_S(x, y)^2 = \left[S^{\frac{1}{2}} X_D^{-\frac{1}{2}}(x-y)\right]^T \left[S^{\frac{1}{2}} X_D^{-\frac{1}{2}}(x-y)\right]$$

where $S^{\frac{1}{2}} = \sum_i \lambda_i^{1/2} u_i u_i^T$.

Hence the optimal distance is obtained by first transforming the data points by $$S^{\frac{1}{2}} X_D^{-\frac{1}{2}}$$

and then computing the Euclidean distance in the transformed space.

$$\lambda_i = \frac{\exp\left(-\frac{u_i^T \check{X}_S u_i}{\mu}\right)}{\sum_{i=1}^{p} \exp\left(-\frac{u_i^T \check{X}_S u_i}{\mu}\right)}$$

Note that $u_i$ are the eigenvectors of the symmetric matrix $$\check{X}_S = X_D^{-1/2} X_S X_D^{-1/2}.$$

$$X_S = \frac{1}{N}\sum_{i=1}^{N} C_i \text{ and } X_D = X_S + \frac{n}{n-1} C_m,$$

where $C_i$ and $C_m$ are the within class and between class covariance matrices respectively. Note that S, $$S^{\frac{1}{2}}$$

and $\check{X}_S$ share common eigenvectors. The value $\mu$ is obtained by calculating the Fisher Information $I(\mu)$ for a grid of $\mu$ values spanning the range of eigenvalues of $\check{X}_S$, and taking the local maxima of $I(\mu)$ as the optimal $\mu$ value.

It will be appreciated that the above embodiments have been described by way of example only. Other applications or variants of the disclosed techniques may become apparent to a person skilled in the art once given the disclosure herein. The scope of the present disclosure is not limited by the above-described embodiments but only by the accompanying claims.

The invention claimed is:

1. A method of classifying a user into one of a plurality of user classes, the method comprising:
receiving one or more voice samples sampling a voice of the user;
generating a frequency spectrum from the one or more voice samples;
extracting one or more values quantifying respective features of the frequency spectrum, wherein each of the respective features is defined by a value of frequency, amplitude, and/or position in the frequency spectrum, and wherein one or more of the respective features are resonant frequencies in the voice of the user;
generating a user profile of the user, the user profile comprising the extracted one or more values; and
supplying the user profile to a machine learning algorithm to train the machine learning algorithm to classify users as belonging to one of the plurality of user classes based on the one or more values in their respective user profile, wherein the one or more values of the user profile form a respective data point in a feature space, and wherein the machine learning algorithm implements a multi-class distance metric learning scaled linear discriminant analysis (SLDA) and is trained to classify users as belonging to one of the plurality of classes by transforming co-ordinates of the feature space, wherein the co-ordinates of the transformed feature space are a linear transformation of the respective data points and amount to a direction of maximal dissimilarity between user classes, and wherein the machine learning algorithm is trained to learn a distance metric that projects the respective data points onto the direction of maximal dissimilarity, wherein similar data points are clustered more closely while dissimilar points stay bounded, wherein the machine learning algorithm identifies orthogonal directions where class dissimilarities are maximized, the first SLDA component having the maximum class separation with linear decision boundaries and the subsequent components having the next maximum class separation in an orthogonal fashion, and wherein the machine learning algorithm scales the direction to obtain optimal class separation using an entropy tuning technique, and wherein the same distance metric is used for measuring distances between points, regardless of the class, while controlling the collapse of dimensions by enforcing a bound based on the Von Neumann entropy of the optimal metric.

2. The method according to claim 1, wherein at least one of the resonant frequencies is the resonant frequency of a body cavity of the user.

3. The method according to claim 2, comprising adapting a permissions setting of a user device based on which user class the user is classified into, wherein the permissions setting allows conditional access to a system of the user device.

4. The method according to claim 1, comprising:
subsequently generating an unclassified user profile for an unclassified user, the unclassified user profile comprising one or more values quantifying respective features of a frequency spectrum generated from a voice sample received from the unclassified user; and
supplying the unclassified user profile to the trained machine learning algorithm, and based thereon classifying the unclassified user into one of the plurality of user classes based on the one or more values in the unclassified user profile.

5. The method according to claim 1, wherein the plurality of user classes comprise: a father class, a mother class, and one or more children classes.

6. The method according to claim 1, wherein each of at least some of the plurality of user classes is an individual user class.

7. The method according to claim 1, wherein at least one of the resonant frequencies is a fundamental frequency of the user's voice.

8. The method according to claim 1, wherein the respective features comprise one or more of:
an amplitude and/or frequency of one or more maxima of the frequency spectrum;
an amplitude and/or frequency of one or more minima of the frequency spectrum; and
one or more integrals corresponding to respective areas delineated by adjacent minima of the generated frequency spectrum.

9. The method according to claim 1, wherein said receiving of the one or more voice samples from the user comprises receiving a plurality of voice samples from the user, and wherein said generating of the frequency spectrum comprises generating an average frequency spectrum from the plurality of voice samples; and wherein said extracting comprises extracting the one or more values of the respective features from the average frequency spectrum.

10. The method according to claim 1, comprising generating a spectral envelope of the frequency spectrum, and wherein said extracting comprises extracting the one or more values of the respective features of the spectral envelope.

11. The method according to claim 10, wherein the spectral envelope is generated by applying a spline fit to the frequency spectrum.

12. The method according to claim 1, comprising:
determining an average phoneme generation rate of the user based on the received one or more voice samples, wherein the user profile comprises the average phoneme generation rate; and wherein the machine learning algorithm is also trained to classify a user as belonging to one of the plurality of user classes based on the average phoneme generation rate in the user profile.

13. The method according to claim 1, comprising:
over time, receiving additional voice samples from the user; and
generating an updated frequency spectrum from the additional voice samples;
extracting one or more values quantifying respective features of the updated frequency spectrum; and
updating the user profile of the user based on the values defining respective features of the updated frequency spectrum.

14. The method according to claim 1, wherein the generated user profile comprises a user identifier of the user.

15. The method according to claim 14, comprising receiving the user identifier from the user.

16. The method according to claim 1, wherein each of the one or more voice samples is a respective time domain signal, and wherein generating the frequency spectrum comprises, for each time domain signal:
applying a windowing function to the time domain signal to create a first data set and a second data set, wherein the first and second data sets are formed of sequential samples of the time domain signal, and wherein the second data set is offset in time by at least one sample compared to the first data set;
applying a frequency domain transform to the first data set and the second data set to transform the first and second data sets to first and second transformed data sets respectively;
performing a complex spectral phase evolution on the first and second transformed data sets to estimate underlying component frequencies corresponding to oscillator peaks in the first and second datasets, wherein the complex spectral phase evolution is performed by determining the complex product of the first and second transformed data sets;
determining a high resolution frequency domain transform of the windowing function, and using the component frequencies to fit said transform of the windowing function to at least one of an amplitude, phase, amplitude modulation and frequency modulation of at least one of said oscillator peaks; and generating the frequency spectrum out of one or more of said oscillator peaks that have been identified, using a tracking algorithm, as emanating from the user.

17. A controller for classifying a user into one of a plurality of user classes, wherein the controller is configured to:

receive one or more voice samples from the user;

generate a frequency spectrum from the one or more voice samples;

extract one or more values defining respective features of the frequency spectrum, wherein each of the respective features is defined by a value of frequency, amplitude, and/or position in the frequency spectrum, and wherein one or more of the respective features are resonant frequencies in the voice of the user;

generate a user profile of the user, the user profile comprising the extracted one or more values; and supply the user profile to a machine learning algorithm that is trained to classify users as belonging to one of the plurality of user classes based on the one or more values in their respective user profile, wherein the one or more values of the user profile form a respective data point in a feature space, and wherein the machine learning algorithm implements a multi-class distance metric learning scaled linear discriminant analysis (SLDA) and is trained to classify users as belonging to one of the plurality of classes by transforming co-ordinates of the feature space, wherein the co-ordinates of the transformed feature space are a linear transformation of the respective data points and amount to a direction of maximal dissimilarity between user classes, and wherein the machine learning algorithm is trained to learn a distance metric that projects the respective data points onto the direction of maximal dissimilarity, wherein similar data points are clustered more closely while dissimilar points stay bounded, wherein the machine learning algorithm identifies orthogonal directions where class dissimilarities are maximized, the first SLDA component having the maximum class separation with linear decision boundaries and the subsequent components having the next maximum class separation in an orthogonal fashion, wherein the machine learning algorithm scales the direction to obtain optimal class separation using an entropy tuning technique, and wherein the same distance metric is used for measuring distances between points, regardless of the class, while controlling the collapse of dimensions by enforcing a bound based on the Von Neumann entropy of the optimal metric.

18. A computer readable storage medium in non-transient form containing a computer program for classifying a user into one of a plurality of user classes, wherein the computer program comprises instructions configured so as to, when the program is executed by a computer, cause the computer to perform operations of:

receiving one or more voice samples from the user;

generating a frequency spectrum from the one or more voice samples;

extracting one or more values defining respective features of the frequency spectrum, wherein each of the respective features is defined by a value of frequency, amplitude, and/or position, and wherein one or more of the respective features are resonant frequencies in the voice of the user;

generating a user profile of the user, the user profile comprising the extracted one or more values; and supplying the user profile to a machine learning algorithm that implements a multi-class distance metric learning scaled linear discriminant analysis (SLDA) and is trained to classify users as belonging to one of the plurality of user classes based on the one or more values in their respective user profile, wherein the one or more values of the user profile form a respective data point in a feature space, and wherein the machine learning algorithm is trained to classify users as belonging to one of the plurality of classes by transforming co-ordinates of the feature space, wherein the co-ordinates of the transformed feature space are a linear transformation of the respective data points and amount to a direction of maximal dissimilarity between user classes, and wherein the machine learning algorithm is trained to learn a distance metric that projects the respective data points onto the direction of maximal dissimilarity, wherein similar data points are clustered more closely while dissimilar points stay bounded, wherein the machine learning algorithm identifies orthogonal directions where class dissimilarities are maximized, the first SLDA component having the maximum class separation with linear decision boundaries and the subsequent components having the next maximum class separation in an orthogonal fashion, wherein the machine learning algorithm scales the direction to obtain optimal class separation using an entropy tuning technique, and wherein the same distance metric is used for measuring distances between points, regardless of the class, while controlling the collapse of dimensions by enforcing a bound based on the Von Neumann entropy of the optimal metric.

* * * * *